United States Patent [19]

Newton

[11] Patent Number: 5,003,890

[45] Date of Patent: Apr. 2, 1991

[54] STUMP BURNER

[76] Inventor: Geoffrey C. Newton, 3525 Lombard, Everett, Wash. 98201

[21] Appl. No.: 523,958

[22] Filed: May 16, 1990

Related U.S. Application Data

[63] Continuation-in-part of Ser. No. 422,872, Oct. 17, 1989, abandoned.

[51] Int. Cl.$^5$ .......................... F23D 3/00; F23D 5/00
[52] U.S. Cl. .................................... 110/239; 110/346
[58] Field of Search ............................. 110/239, 346; 126/271.3

[56] References Cited

U.S. PATENT DOCUMENTS

| | | |
|---|---|---|
| 205,465 | 7/1878 | Bates . |
| 1,065,738 | 6/1913 | Smith . |
| 1,066,535 | 7/1913 | Ross . |
| 1,069,240 | 8/1913 | Entrekin . |
| 1,171,824 | 2/1916 | Wilfong . |
| 1,190,006 | 7/1916 | Ratliff . |
| 1,518,929 | 12/1924 | Holt . |
| 1,627,867 | 5/1927 | Reynolds . |

Primary Examiner—Edward G. Favors
Attorney, Agent, or Firm—Ward Brown; Robert W. Beach

[57] ABSTRACT

A stand supports a blast pipe generally upright with its open bottom end engaging against a stump. Fuel is inserted into the pipe and ignited. A blower injects air into the pipe to intensify the combustion of the fuel and promote burning of the stump adjacent to the bottom end of the pipe. The pipe is advanced into the stump as the stump is burned.

18 Claims, 2 Drawing Sheets

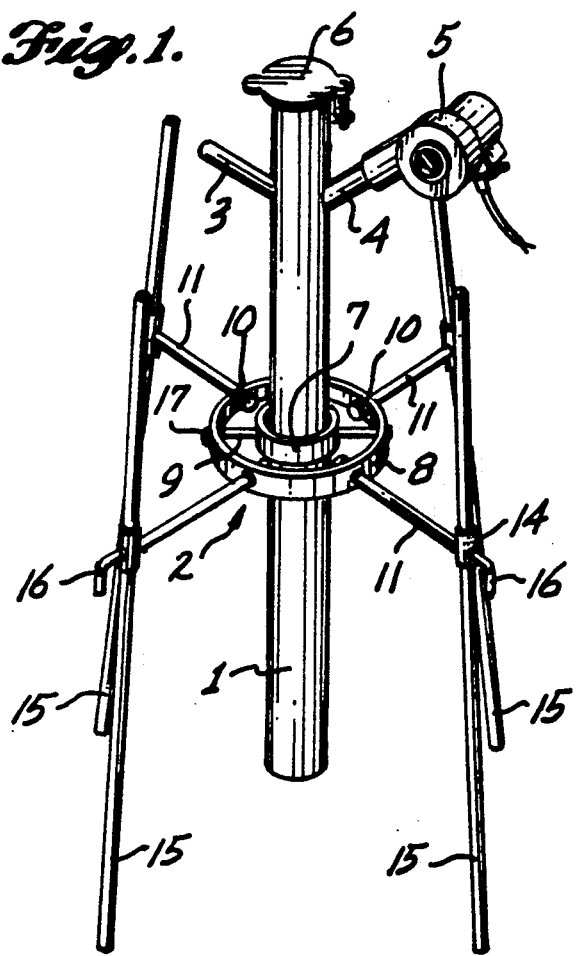
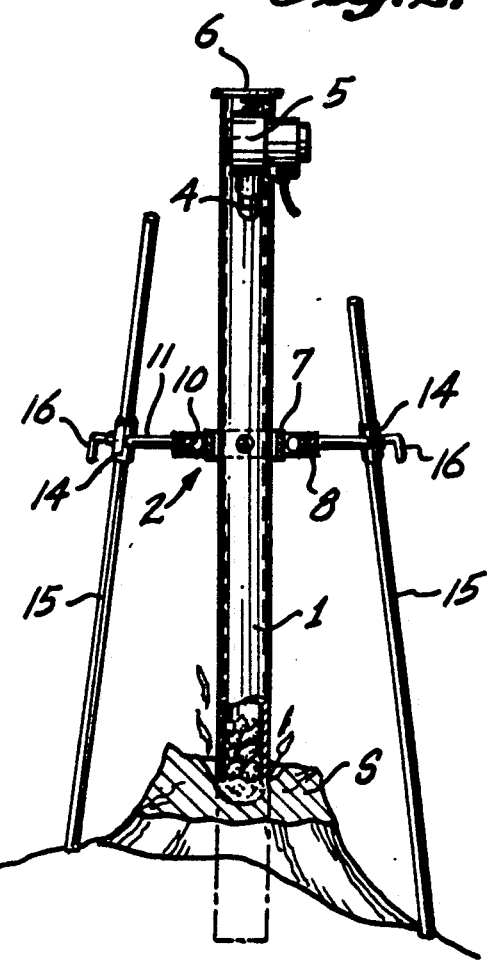
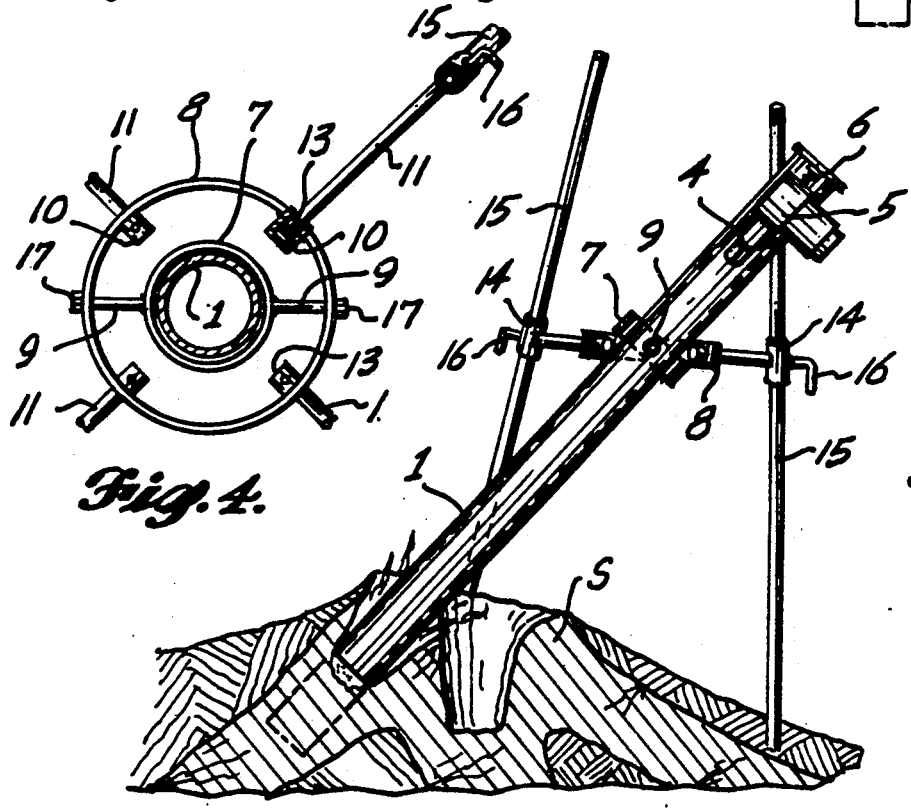

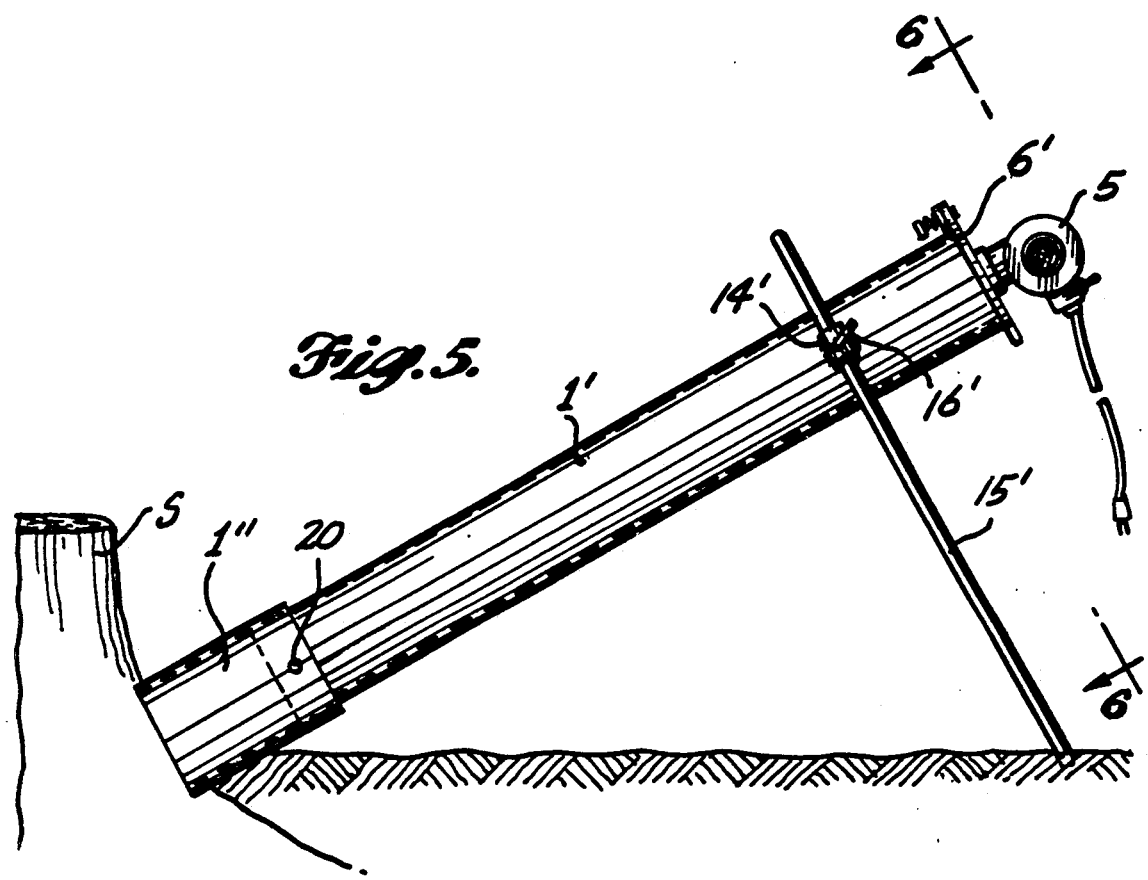
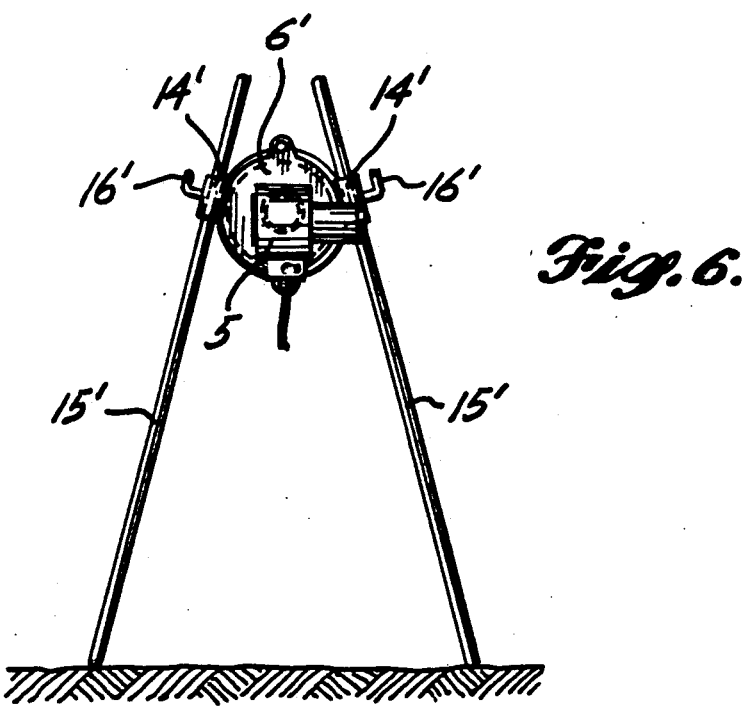

STUMP BURNER

This application is a continuation-in-part of copending patent application Ser. No. 07/422,872, filed Oct. 17, 1989, for Stump Burner, abandoned as of the filing date accorded this application.

BACKGROUND OF THE INVENTION

Field of the Invention

The present invention relates to an incinerator for burning a stump in situ.

Prior Art

Stump removal has been a persistent problem and is particularly troublesome when the stump to be removed is close to a building structure so that blasting, excavation by power equipment and open fires are not appropriate.

Prior devices for burning stumps are disclosed in the following U.S. Pat. Nos.:

205,465, issued July 2, 1878 (Bates);
1,065,738, issued June 24, 1913 (Smith);
1,066,535, issued July 8, 1913 (Ross);
1,171,824, issued Feb. 15, 1916 (Wilfong);
1,190,006, issued July 4, 1916 (Ratliff);
1,518,929, issued Dec. 9, 1924 (Holt);
1,627,867, issued May 10, 1927 (Reynolds);
1,069,240, issued Aug. 5, 1913 (Entrekin).

SUMMARY OF THE INVENTION

It is an object of the present invention to provide a device for burning stumps in place safely, even in close quarters such as adjacent to building structures.

It also is an object to provide such a device utilizing primarily standard component parts and of simple, inexpensive design and manufacture, yet durable over a long period of use.

Another object is to provide such a device in compact form which can be easily disassembled for storage or shipment A further object is to provide such a device which is easy to use, requiring no special expertise or training, and which requires no special tools or fuel In accordance with the present invention, the foregoing objects can be accomplished by providing a single unobstructed blast pipe and a stand for supporting the pipe resting against the stump to be removed. The stand can include adjustable legs to maintain the blast pipe upright or inclined The stand can include a central collar slidably receiving the pipe. Fuel such as coal is inserted into the pipe and lit, whereupon t he top of the pipe is closed by a swingable damper: plate. A blower injects air into the upper portion of the pipe to increase the intensity of the fire. Air from the blower passes downward through and past the fuel and escapes from the lower end of the pipe. The pipe advances as the stump below it is burned away.

BRIEF DESCRIPTION OF THE DRAWINGS

FIG. 1 is a top perspective of a first form of stump burner in accordance with the present invention.

FIG. 2 is a side elevation of the stump burner of FIG. 1 illustrating its use for burning a small stump, with parts broken away, and FIG. 3 is a corresponding side elevation illustrating an alternative manner of use with parts broken away.

FIG. 4 is a horizontal section illustrating the central portion of the stump burner of FIG. 1 in plan, with parts broken away.

FIG. 5 is a side elevation of a second form of stump burner in accordance with the present invention; and FIG. 6 is an end elevation of the stump burner of FIG. 5 from line 6—6 of FIG. 5.

DETAILED DESCRIPTION

With reference to FIGS. 1 and 4, the principal components of the first embodiment of the present invention are a blast pipe 1 and a sturdy stand 2 for maintaining the blast pipe upright. The blast pipe can be stainless steel and preferably has an inside diameter of about 5 inches The blast pipe can be provided with a handle 3 toward one end, the top end as viewed in FIG. 1, and has an inlet conduit 4 in open communication with the interior of the blast pipe. A multispeed blower 5 is effective to inject air into the upper portion of the pipe through the conduit 4. The opposite ends of the blast pipe are open and its interior preferably is open and unobstructed from end to end. A swingable damper plate 6 can be moved to close or partially close the top end of the pipe.

The stand and 2 includes a central collar 7 encircling the blast pipe 1. As seen in FIG. 4, the fit of the pipe in the collar is sufficiently close as to maintain the pipe substantially coaxial with the collar, but sufficiently loose that the pipe is freely slidable in the collar. The collar is pivotally supported on a mounting ring 8 by diametrally opposed stub shafts 9 extending outward from the collar 7 and having their outer end portions journaled in ring 8.

Tubular socket members 10 extend inward from the mounting ring 8 a short distance. The inner ends of such members are closed, but the outer ends are open for receiving the inner end portions of generally horizontal support rods 11 as best seen in FIG. 4. When inserted in the sockets 10, holes 12 through the inner end portions of the rods 11 register with corresponding holes in the sockets 10 for interconnection of the rods and the sockets by insertion of pins 13.

Preferably, four such support rods 11 are provided extending generally radially outward from the mounting ring 8. The outer end portions of such rods 11 carry upright sleeves 14 which receive adjustable support legs 15 Preferably, the sleeves 14 are inclined slightly relative to the rods 11 supporting them so that the legs 15 extend downward and slightly outward from the rods 11 for a sturdy support. Lock screws 16 have threaded inner end portions and handles for turning the screws manually to clamp the legs in desired fixed positions relative to the support rods 11.

With reference to FIG. 2, preferably the stump S to be removed is cut close to the ground. The stand 2 is assembled such that the legs 15 support the central collar 7 at the desired position. Usually the collar will be positioned approximately centrally of the stump with the blast pipe 1 substantially vertical At start up, the bottom end of the blast pipe can be spaced above the top of the stump slightly by a small wood wedge. The damper plate 6 is swung to open the top of the pipe and fuel is inserted and lit. Lumps of coal have been found to be an inexpensive and effective fuel and can be lit by kindling The inventor has found, however, that lumps of coal light quickly and completely if a standard highway flare is dropped into the pipe.

When burning of the fuel has been established, the blower is actuated and the damper is closed for a very hot, long lasting flame. Air injected into the pipe by the blower flows downward through and past the fuel and the products of combustion pass out the bottom end of the pipe into the ambient atmosphere With the damper closed, an air flow of about 60 to about 100 cubic feet per minute has been found to maintain an extremely hot fire which burns away the central portion of a stump. The blast pipe automatically advances downward into the stump as it is burned away. Occasionally, additional lumps of coal are added to maintain the hot concentrated fire. Eventually, the center of the stump is burned away and, if desired, a fire can be started inside the stump to consume the remainder of the stump from the inside.

With reference to FIG. 3, depending on the size and type of the stump to be removed, sometimes it i desirable to burn more than one bore into the stump. For very large stumps, it may be convenient to follow an inclined root R. In that case, the stand 2 can be adjusted so that the mounting ring 8 is more or less inclined with the collar 7 positioned so as to be swingable on its stub shafts 9 to the desired angle The blast pipe 1 still automatically advances through the collar as the stump or root is burned away. If desired, the ends of the stub shaft 9 can be provided with external threads for nuts 17 (FIG. 4) that can be tightened to lock the collar in the desired position, but in most instances it is preferred that the collar be free to swing so as to prevent binding of the pipe in the collar.

Preferably, the blower can be controlled to adjust the volume of air injected into the blast pipe, which has the effect of adjusting the heat of the fire, the length of time that a given quantity of fuel will burn and the speed at which the pipe advances through the stump. The blower is surprisingly effective not only to intensify the fire at the base of the blast pipe, but also to cool the upper portion of the pipe. A 4-foot pipe can be safely handled at approximately its center while a stump is being burned. In addition, since the fire is concentrated at the bottom end of the blast pipe, the burner in accordance with the present invention can be used for stumps close to building structures when other methods of removal would be dangerous, expensive or difficult.

After use, when the bottom end portion of the blast pipe has cooled, the burner in accordance with the present invention can be knocked down into its component parts. The legs 15 and support rods 11 can be conveniently stowed in the blast pipe 1 and the blower 5 can be disconnected from the inlet conduit 4, leaving only three compact component parts to be transported, namely, the blower, mounting ring assembly and the blast pipe containing the support rods and legs.

The embodiment of stump burner in accordance with the present invention illustrated in FIGS. 5 and 6 utilizes an open and unobstructed blast pipe 1', preferably about 3 feet in length and 5 inches in diameter. Such pipe has a replaceable tip portion 1" of heat-resistant steel partially telescoped snugly over the open end of the blast pipe 1' and normally secured in position by a setscrew 20. The other end of the blast pipe can be closed by a swingable damper plate 6' which has a central opening for the outlet of the standard blower 5.

Rather than providing the specialized stand illustrated in FIGS. 1 through 4, for the embodiment of the present invention illustrated in FIGS. 5 and 6 sleeves 14' are secured to the opposite sides of the blast pipe with their central bores extending transversely of the pipe for receiving support legs 15'. Legs 15' are slidable in the sleeves 14' and can be locked in a desired position by locking screws 16' similar to the screws 16 of the previously described embodiment. With reference to FIG. 5, with the open tip 1" resting against the base of a stump S to be removed, the effective length of the legs 15' can be adjusted so as o adjust the angle of inclination of the blast pipe 1'.

Operation of the embodiment of FIGS. 5 and 6 is substantially identical to operation of the embodiment of FIGS. 1 through 4. With the burner positioned as illustrated in FIG. 5, the damper plate 6' can the swung to open the top end of the pipe and fuel such as lumps of coal can be inserted into the upper end portion of the pipe to fall by gravity down through the pipe section 1' and tip 1". The fuel is ignited; the damper plate 6' is closed; and the blower 5 actuated to intensify combustion of the fuel adjacent to the stump. The blast pipe tends to advance inward into the stump and as necessary the support legs 15' can be used as handles for manually moving the blast pipe generally lengthwise toward the stump to engage the replaceable tip 1" against the stump. As for the previously described embodiment, after use the burner can be knocked down into its component parts for compact storage and transportation.

I claim:

1. A device for burning a stump by use of a combustible fuel comprising a single elongated blast pipe open at least one end and having an open and unobstructed interior, means for supporting said blast pipe in generally upright position with its open end engaged against the stump for containment of a quantity of the combustible fuel in the bottom portion of said pipe adjacent to the stump, and means for injecting air into said pipe for passage through the fuel to intensify combustion thereof adjacent to the open end of said pipe for burning the stump in the area of said open end of said pipe, said supporting means including upright support legs and a collar slidably receiving said blast pipe for permitting free movement of said blast pipe by gravity downward into the stump as the stump is burned away below said pipe.

2. The device defined in claim 1, in which the collar is swingable relative to the support legs.

3. The device defined in claim 1, including a swingable damper plate for closing the end of the blast pipe opposite the open end.

4. The device defined in claim 1, in which the air-injecting means includes a blower.

5. The device defined in claim 6, including a swingable damper plate for closing the end of the blast pipe opposite the open end and having an air inlet opening, and means for coupling the blower to said damper plate for injecting air from the blower through said damper plate opening.

6. The device defined in claim 1, in which the air-injecting means includes an inlet opening adjacent to the end of the blast pipe remote from its open end and a blower for blowing air through said inlet opening into the interior of the blast pipe.

7. The device defined in claim 1, in which the supporting means includes generally upright legs, a mounting ring supported on said legs and a collar slidably receiving the central portion of the blast pipe and carried by said mounting ring.

8. The device defined in claim 7, in which the collar is pivotally supported on the mounting ring.

9. The device defined in claim 1, in which the supporting means includes upright support legs and means for adjusting said legs relative to the blast pipe.

10. The device defined in claim 1, in which the blast pipe includes a first elongated portion and a second replaceable tip portion attached to said first portion.

11. The method of burning a stump which comprises engaging the open bottom end of a single unobstructed blast pipe against the stump, supporting the blast pipe in generally upright position, inserting particles of fuel into the upper portion of the pipe for passage downward into the lower portion of the pipe adjacent to the stump, igniting the particles of fuel in the lower portion of the pipe, forcefully injecting air into the upper portion of the pipe for passage downward around the fuel and out the open end of the pipe to intensify combustion of the particles of fuel, and advancing the pipe into the stump as the stump is eaten away by the action of the combustion.

12. A device for burning a stump by use of a combustible fuel comprising a single elongated blast pipe open at least one end and having an open and unobstructed interior, means for supporting said blast pipe in generally upright position with its open end engaged against the stump for containment of a quantity of the combustible fuel in the bottom portion of said pipe adjacent to the stump, means for injecting air into said pipe for passage through the fuel to intensify combustion thereof adjacent to the open end of said pipe for burning the stump in the area of said open end of said pipe, and a swingable damper plate for closing the end of said blast pipe opposite said open end.

13. The device defined in claim 12, in which the air-injecting means includes a blower and the damper plate includes an air inlet opening, and including means for coupling said blower to said damper plate for injecting air from said blower through said damper plate opening.

14. A device for burning a stump by use of a combustible fuel comprising a single elongated blast pipe open at least one end and having an open and unobstructed interior, means for supporting said blast pipe in generally upright position with its open end engaged against the stump for containment of a quantity of the combustible fuel in the bottom portion of said pipe adjacent to the stump, and means for injecting air into said pipe for passage through the fuel to intensify combustion thereof adjacent to the open end of said pipe for burning the stump in the area of said open end of said pipe, said air-injecting means including an inlet opening adjacent to the end of said blast pipe remote from its open end and a blower for blowing air through said inlet opening into the interior of said blast pipe.

15. A device for burning a stump by use of a combustible fuel comprising a single elongated blast pipe open at least one end and having an open and unobstructed interior, means for supporting said blast pipe in generally upright position with its open end engaged against the stump for containment of a quantity of the combustible fuel in the bottom portion of said pipe adjacent to the stump, and means for injecting air into said pipe for passage through the fuel to intensify combustion thereof adjacent to the open end of said pipe for burning the stump in the area of said open end of said pipe, said supporting means including generally upright legs, a mounting ring supported on said legs and a collar slidably receiving the central portion of said blast pipe and carried by said mounting ring.

16. The device defined in claim 15, in which the collar is pivotally supported on the mounting ring.

17. A device for burning a stump by use of a combustible fuel comprising a single elongated blast pipe open at least one end and having an open and unobstructed interior, means for supporting said blast pipe in generally upright position with its open end engaged against the stump for containment of a quantity of the combustible fuel in the bottom portion of said pipe adjacent to the stump, and means for injecting air into said pipe for passage through the fuel to intensify combustion thereof adjacent to the open end of said pipe for burning the stump in the area of said open end of said pipe, said supporting means including upright support legs and means for adjusting said legs relative to said blast pipe.

18. A device for burning a stump by use of a combustible fuel comprising a single elongated blast pipe open at least one end and having an open and unobstructed interior, means for supporting said blast pipe in generally upright position with its open end engaged against the stump for containment of a quantity of the combustible fuel in the bottom portion of said pipe adjacent to the stump, and means for injecting air into said pipe for passage through the fuel to intensify combustion thereof adjacent to the open end of said pipe for burning the stump in the area of said open end of said pipe, said blast pipe including a first elongated portion and a second replaceable tip portion attached to said first portion.

* * * * *

UNITED STATES PATENT AND TRADEMARK OFFICE
CERTIFICATE OF CORRECTION

PATENT NO. : 5,003,890
DATED : April 2, 1991
INVENTOR(S) : Geoffrey C. Newton

It is certified that error appears in the above-identified patent and that said Letters Patent is hereby corrected as shown below:

```
Claim 1:   column 4, line 32, before "least" insert --at--.

Claim 5:   column 4, line 53, cancel "6" and insert --4--.

Claim 12:  column 5, line 23, after "open" insert --at--.

Claim 14:  column 5, line 42, after "open" insert --at--.

Claim 15:  column 6, line  7, after "open" insert --at--.

Claim 17:  column 6, line 24, after "open" insert --at--.

Claim 18:  column 6, line 38, after "open" insert --at--.
```

Signed and Sealed this

Twenty-eighth Day of July, 1992

Attest:

DOUGLAS B. COMER

*Attesting Officer*   *Acting Commissioner of Patents and Trademarks*